No. 722,656. PATENTED MAR. 10, 1903.
C. NIELSEN.
DEVICE FOR ACTUATING SHUT-OFF VALVES FOR PISTON AND VALVE MOVEMENTS OF ANY KIND.
APPLICATION FILED OCT. 2, 1902.
NO MODEL. 2 SHEETS—SHEET 1.

Inventor
Carl Nielsen
By H. B. Willson & Co.
Attorneys

Witnesses

No. 722,656. PATENTED MAR. 10, 1903.
C. NIELSEN.
DEVICE FOR ACTUATING SHUT-OFF VALVES FOR PISTON AND VALVE MOVEMENTS OF ANY KIND.
APPLICATION FILED OCT. 2, 1902.
NO MODEL. 2 SHEETS—SHEET 2.

Witnesses:

Inventor
Carl Nielson
By H. B. Willson & Co.
Attorneys.

UNITED STATES PATENT OFFICE.

CARL NIELSEN, OF COPENHAGEN, DENMARK.

DEVICE FOR ACTUATING SHUT-OFF VALVES FOR PISTON OR VALVE MOVEMENTS OF ANY KIND.

SPECIFICATION forming part of Letters Patent No. 722,656, dated March 10, 1903

Application filed October 2, 1902. Serial No. 125,707. (No model.)

*To all whom it may concern:*

Be it known that I, CARL NIELSEN, manufacturer, a subject of the King of Denmark, residing at 7 Münstersweg, Copenhagen, in the Kingdom of Denmark, have invented certain new and useful Improvements in Devices for Actuating Shut-Off Valves for Piston or Valve Movements of Any Kind, of which the following is a full, clear, and exact description.

My invention is an improved automatic controller for fluid-pressure mechanism; and it consists in the peculiar construction and combination of devices hereinafter fully described and claimed.

The object of my invention is to provide an improved device which is adapted to automatically control the passage of fluid under pressure from a fluid-pressure mechanism, such as an air-pump or gasometer, to a receiver, such as an inflatable tire or reservoir, and by means of which the connecting medium will be automatically closed when the pressure in the receiver reaches the desired point, or the pressure mechanism, such as an air-pump, be put automatically out of action when the pressure in the receiver reaches the desired point.

Figure 1:
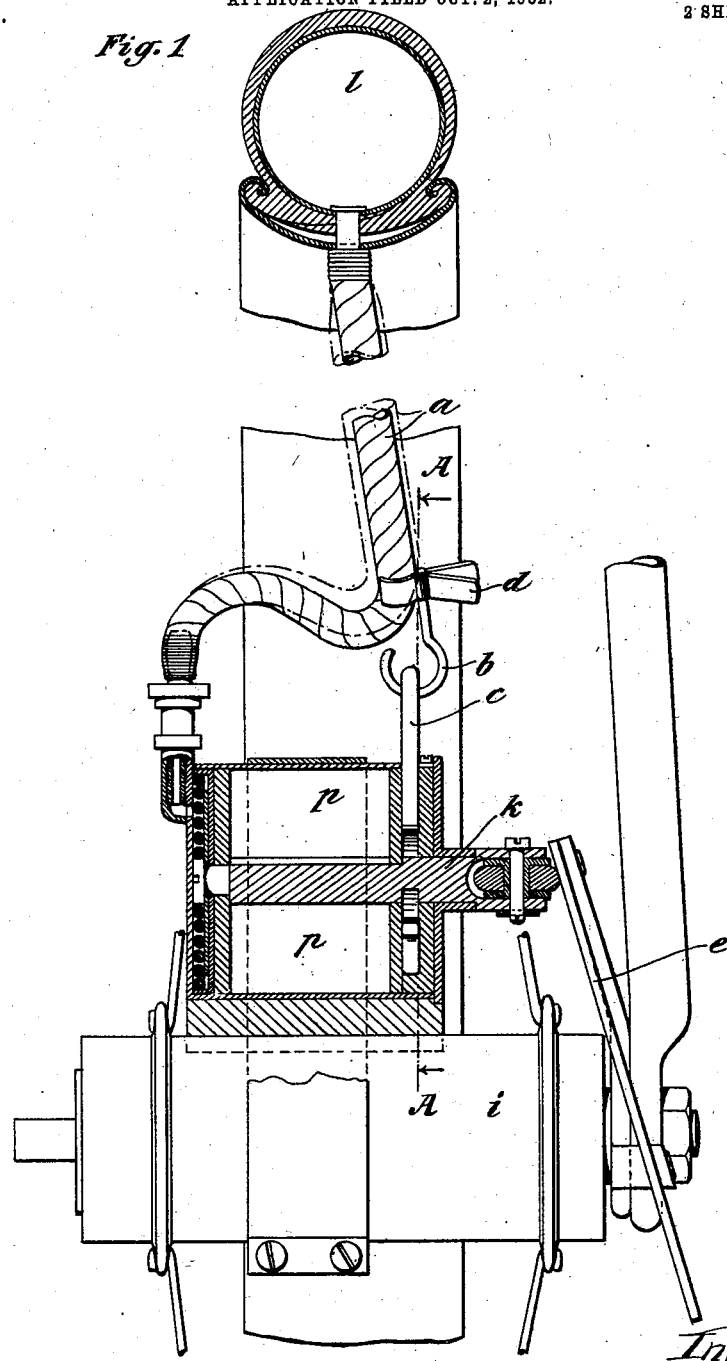
Figure 2:
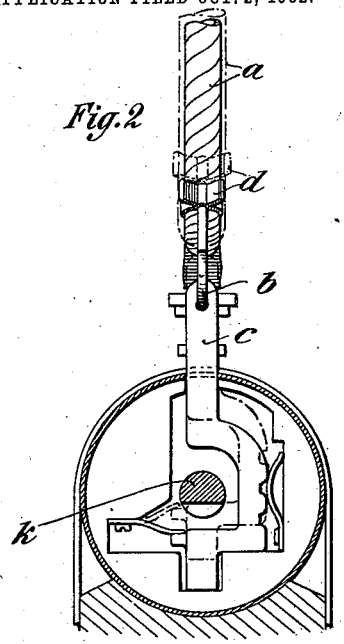
Figure 3:
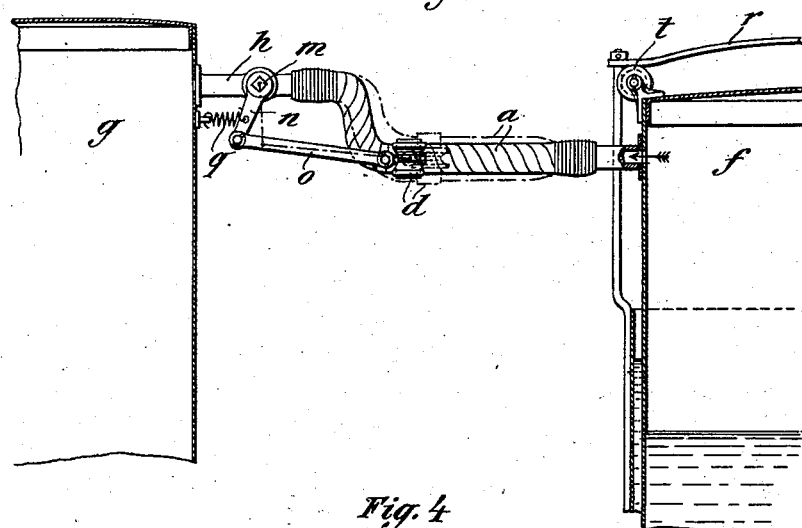
Figure 4:
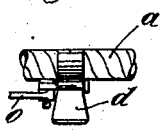

In the accompanying drawings, Figure 1 is a sectional view showing a portion of a bicycle-wheel provided with an air-pump and a tire connected together by my improved automatic controller. Fig. 2 is a sectional view of the same, taken on the plane indicated by the line A A of Fig. 1. Fig. 3 is a sectional view illustrating a modification of my invention. Fig. 4 is a detail view showing a portion of the inflatable expansible connecting-hose and the clamp adjustably attached thereto.

In the embodiment of my invention I provide an expansible flexible hose $a$, which may be made of india-rubber or any other suitable elastic material and which may be of any suitable construction adapted to be expanded by fluid—as gas, air, or the like—under pressure therein to distend it diametrically and correspondingly shorten it, so that the said hose is susceptible to deformation or alteration of its shape by variations of the pressure therein.

In Figs. 1 and 2 the expansible hose is shown connected to an air-pump $p$ on the hub $i$ of a bicycle-wheel and also connected to the pneumatic or inflatable tire $l$ thereof. The piston of the pump has a rod $k$, notched on one side and provided at its outer end with a roller, which engages a revoluble cam $e$, which when it is turned operates the piston, and hence causes air to be compressed by the pump and forced through the hose $a$ into the tire $l$. The air-pump is provided with a detent $c$, (here shown as a longitudinally-movable bolt-hook,) which is adapted when moved in one direction to engage the notch in the piston-rod $k$ to lock the latter against operation and at the inner limit of its stroke, and when moved in the reverse direction is adapted to disengage said notch to release the piston-rod, and hence put the pump in condition to be actuated. A clamp $d$ is connected to and carried by the expansible hose $a$. This clamp may be of any suitable form and is preferably of such construction that it is adapted to be adjustably secured to the expansible hose. A link $b$, which is here shown as a hook, is attached to the clamp and connected to the detent $c$.

When the air-pump is operated, the compressed air is conducted therefrom to the tire $l$ through the expansible hose $a$, which latter retains its shape until the pressure in the tire becomes such as is required, and thereafter the continued action of the pump causes the pressure in the hose $a$ to expand the same and correspondingly shorten it, with the result that the detent $c$ is moved by its connection with the hose into engaged position with the piston-rod of the air-pump, thereby putting the latter out of action. When the pressure in the tire diminishes, the hose $a$ reassumes its normal form and size, (indicated in full lines in Fig. 1,) and hence moves the detent $c$ out of engagement with the piston-rod, thereby causing the air-pump to be again started in operation.

In Fig. 3 of the drawings the expansible hose $a$ forms the connection between a gasometer-bell $f$ and a gas-receiver $g$. A valve $h$ is interposed between the hose $a$ and gas-receiver, and the stem $m$ of the valve has an operating-arm $n$, which is engaged by a spring $q$, which acts to normally close the valve. The gasometer-bell is shown as provided with a guide-roller $t$, which engages a verticallydisposed guide-rod, which is shown as extending from the upper portion of the water-tank in which the gasometer-bell floats and is connected at its upper end to a yoke r, which forms a stop adapted to be engaged by the roller t when the bell rises by the pressure of the gas therein. The clamp d on the expansible hose a is connected by a link o to the arm n of the valve h. When the bell is arrested at the upper limit of its movement by the engagement of the roller t with the stop r, the pressure in the hose a becomes such as to expand the hose laterally and contract it in length, and thereby cause the clamp d to move, as indicated in dotted lines in Fig. 3, and cause the link o and arm n to close the valve h. On the descent of the gasometer-bell, caused by a diminution of the gas-pressure therein, the hose a reassumes its normal condition, causing the link o to release the valve h, whereupon the spring q closes the valve to cut off communication between the gasometer-bell and the receiver g.

From the foregoing description, taken in connection with the accompanying drawings, the construction, mode of operation, and advantages of the invention will be readily apparent, it is thought, without requiring a more extended explanation.

Various changes in the form, proportion, and the minor details of construction may be resorted to without departing from the principle or sacrificing any of the advantages of my invention.

I claim—

1. The combination of a source of compressed fluid, a fluid-pressure container fed thereby, a flexible connecting element between them, capable of variations in form under varying pressures, and a controlling element automatically operated by the deformation of the flexible connecting element caused by the variations of pressure therein, substantially as described.

2. The combination of a fluid-pressure receiver, mechanism for supplying fluid under pressure thereto, a flexible connecting element between said receiver and said mechanism, capable of variations in form under varying pressures, and a connection between the said flexible element, and a controlling element in the said mechanism to automatically control the latter by the deformation of the flexible element caused by the variations of the pressure therein, substantially as described.

3. The combination of a source of compressed fluid, a flexible tubular element leading therefrom and capable of variations in form under varying pressures, and a controlling element connected to the said flexible tubular element and automatically operated by the deformation thereof, caused by the variations of pressure therein, substantially as described.

In witness whereof I subscribe my signature in presence of two witnesses.

CARL NIELSEN.

Witnesses:
 HENRY HASPER,
 WOLDEMAR HAUPT.